United States Patent [19]

Gavagan

[11] Patent Number: 4,620,742
[45] Date of Patent: Nov. 4, 1986

[54] VISOR DETENT

[75] Inventor: James A. Gavagan, Centerline, Mich.

[73] Assignee: Irvin Industries Inc., Rochester Hills, Mich.

[21] Appl. No.: 673,787

[22] Filed: Nov. 21, 1984

[51] Int. Cl.[4] .............................................. B60J 3/02
[52] U.S. Cl. ................................................. 296/97 K
[58] Field of Search ......................... 296/97 K, 97 R; 248/291, 293; 403/397

[56] References Cited

U.S. PATENT DOCUMENTS

| 2,458,707 | 1/1949 | Jacobs | 296/97 K |
| 3,556,585 | 1/1971 | Binder | 296/97 K |
| 4,070,054 | 1/1978 | Cziptschirsch | 296/97 K |
| 4,428,612 | 1/1984 | Viertel et al. | 296/97 K |

FOREIGN PATENT DOCUMENTS

| 68269 | 1/1983 | European Pat. Off. | 296/97 K |
| 2458415 | 2/1981 | France | 296/97 K |

Primary Examiner—Robert R. Song
Attorney, Agent, or Firm—Lloyd M. Forster

[57] ABSTRACT

Wrap around spring detent sun visor arm for automotive vehicle capable of holding any adjusted visor use position with required torque resistance and with supplemental raised storage torque resistance, all torque resistance being provided by wrap around spring engagement with a visor arm rod having a flat for detent engagement by corresponding flat in the wrap around spring.

7 Claims, 9 Drawing Figures

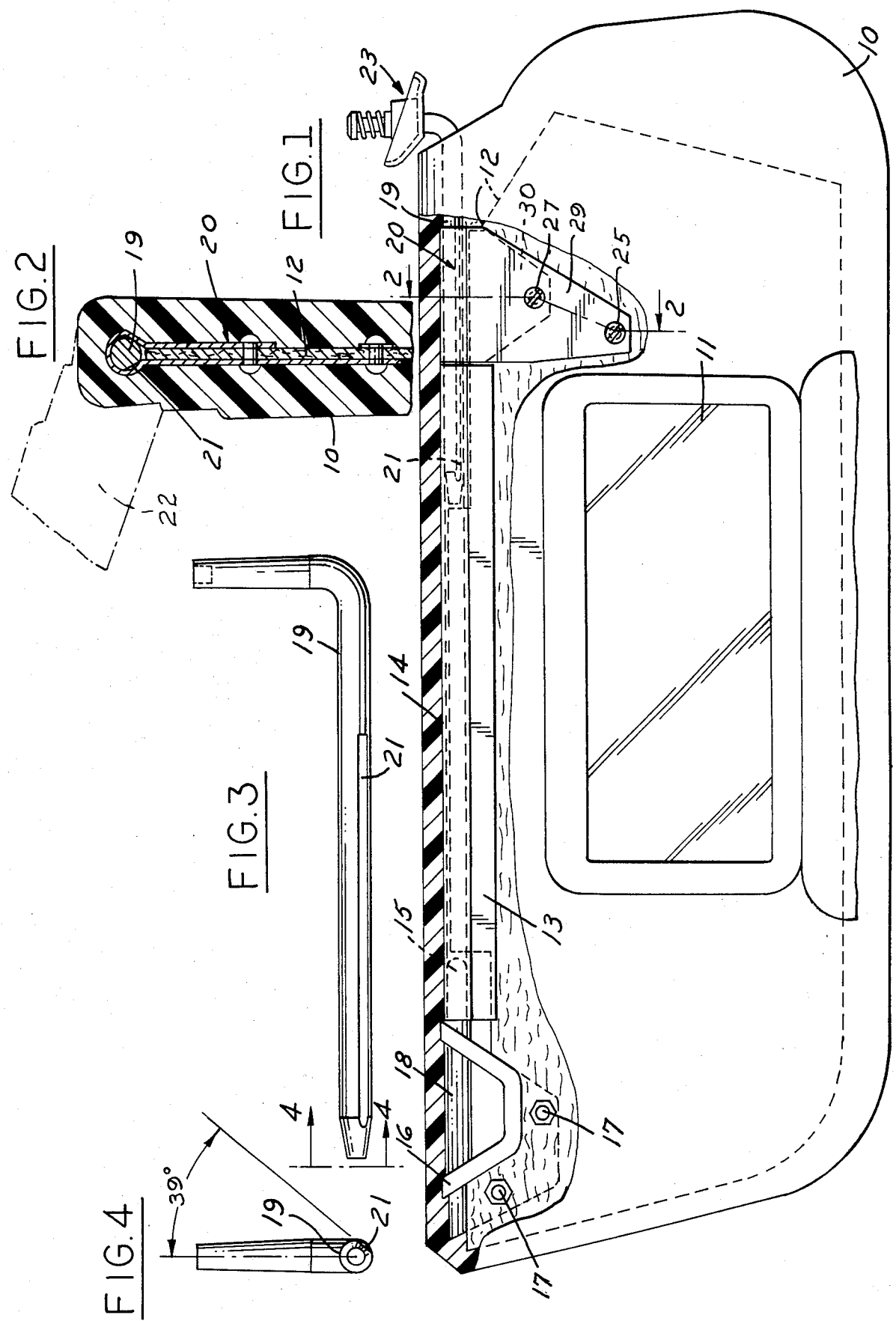

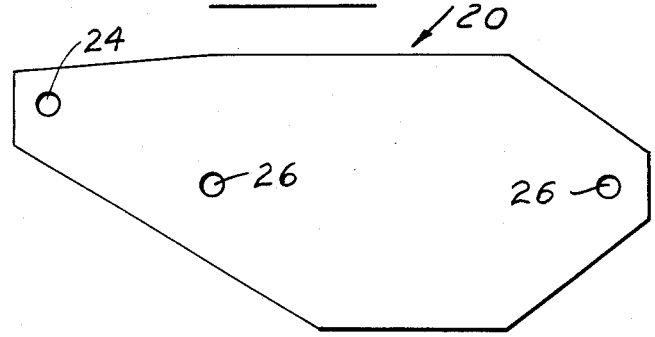
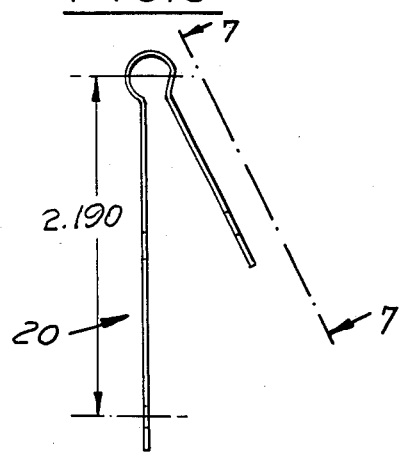
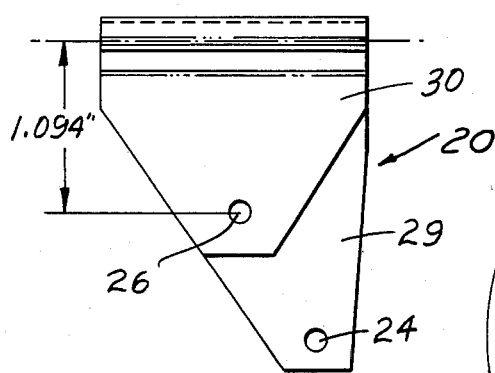
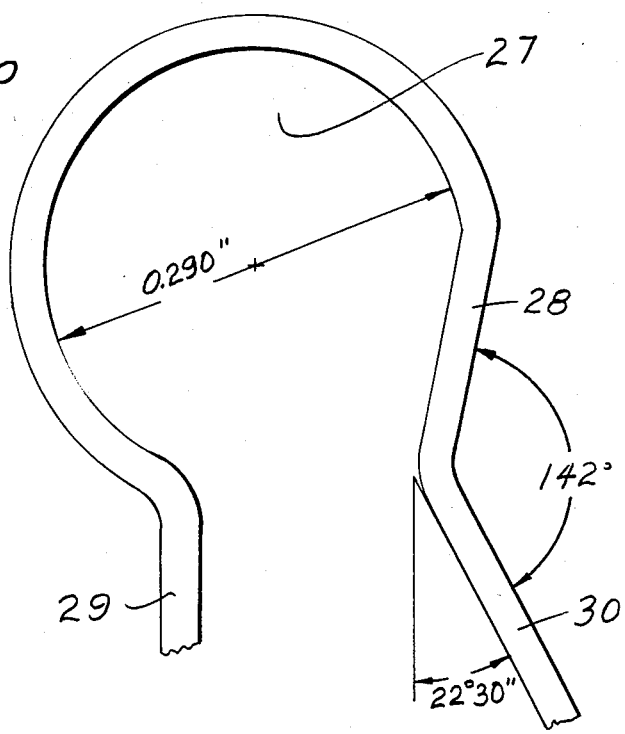
FIG.9 PRIOR ART

VISOR DETENT

BACKGROUND OF THE INVENTION

Sun visors for automotive vehicles conventionally employ adjustment screws for tightning visor and arm connections so that the visor will remain stored in raised condition against weight and vibration as well as at any desired angular position during use.

In some cases spring detent provisions have been employed in combination with flats on the visor arm, without adjusting means, to retain the visor in raised stored position, combined with frictional tubes along the pivotal edge of the visor for engaging the cylindrical mounting rod arm. Such frictional tubes have been formed with interference fits designed to provide adequate torque reaction for holding the visor in any angular adjusted use position and attempts have been made to provide limited spring characteristics and accurately size the inner tube dimension to assure consistency and durability of desired retention characteristics.

Such detent and supplemental frictional means have not been entirely satisfactory in several respects, as where double opposed flat detent springs engage opposed rod flats resulting in two detent positions 180° apart. Snap action to an undesired position 180° from storage has sometimes been encountered during use leading to sudden sun glare; and material variations in visor edge tubing, including heat treatment affecting spring quality, has led to undependable frictional characteristics in retaining adjusted visor position over the life of the car. Certain attempts have been made to employ opposed flat leaf springs, riveted to each other through an intermediate fiberboard core with free spring ends engaging the rod arm at respective longitudinally spaced locations with only one spring end aligned with a single flat thereby limiting the detent action to a single stored position of the visor. However, the holding power in stored position has been found to be inadequate or undependable since a flat spring with adequate thickness for sufficient torque resistance when engaging a single flat involves critical dimensions and compressive preload stress on the assembly rivets and a loss of adequate torque resistance under fatigue testing.

BRIEF DESCRIPTION OF THE PRESENT INVENTION

In order to provide improved detent and retention characteristics for both stored and any angular use condition, a spring detent has been devised employing a single wrap around leaf spring element having a flat portion for engaging a single flat on the mounting arm corresponding to stored position. The same flat in the spring, when not in registration with the flat on the mounting arm, provides frictional torque resisting contact of desired lower value for maintaining any angular use position of the visor.

By employing such wrap around construction with opposed ends riveted at the fiberboard core, a relatively much thinner spring steel material may be employed than in the case of a free ended flat detent spring and adequate torque retention has been achieved over full life cycle testing with no appreciable loss or change throughout the entire life cycle.

BRIEF DESCRIPTION OF THE DRAWINGS

FIG. 1 is a face view of the visor assembly employing the wrap around detent of the present invention;

FIG. 2 is a sectional view taken along the line 2—2 of FIG. 1;

FIG. 3 is a detailed view of the visor rod arm;

FIG. 4 is an end view taken along the line 4—4 of FIG. 3;

FIG. 5 is a flat blank view of the wrap around detent spring;

FIG. 6 is an end view of the wrap around detent spring in formed free form condition;

FIG. 7 is a view taken along the line 7—7 of FIG. 6;

FIG. 8 is a ten times enlarged fragmentary view of the wrap around portion of the spring illustrated in FIG. 6;

FIG. 9 is an end view of a prior art construction employing a pair of flat leaf springs.

DETAILED DESCRIPTION OF A PREFERRED EMBODIMENT

The visor comprises conventional padded body visor 10 with vanity mirror 11 supported on fiberboard core 12 extending within stiffener 13 formed with tubular bend 14 receiving projection 15 of plastic clip 16 at one end, riveted to fiberboard core at 17 with cylindrical element 18 adapted for engagement with a stationary header clip in stored and forward sun shielding positions. A shorter than conventional mounting rod arm 19 engages the other end of stiffener 14 and projects through wrap around spring detent 20 having a flat formed to engage matching flat 21 on rod arm 19 in stored position 22 of the visor shown in phantom in FIG. 2. Conventional visor arm bracket 23 completes the assembly.

With reference to FIGS. 3 and 4, visor rod arm 19 is provided with flat 21 to a depth of 0.010" at a 39° angle to the vertical as shown in FIG. 4, rod 19 having a diameter of 0.280".

With references to FIGS. 6–8, wrap around spring detent 20 is shown in its initial flat blank form in FIG. 5 with pierced hole 24 for rivet 25, shown in FIG. 1, and pierced holes 26 aligned for rivet 27, shown in FIG. 1, preformed in the blank. It is formed as shown in FIG. 6 with circular wrap 27 having flat 28 formed for engagement with flat 21 in rod arm 19, as shown in FIGS. 3 and 4, and with a longer attachment leg 29 and shorter leg 30 for rivet attachment to fiberboard core 12, as shown in FIG. 1.

Dimensions shown in FIGS. 6, 7 and 8 are for the wrap around detent employed in a typical visor with a 0.280 dia. rod arm having a 0.010" deep flat and can be made of appropriate thickness for the size and weight of visor. This spring thickness may be less than 0.020" for a typical visor specification, e.g. requiring resistance in the range of 1.83–3.83 pounds out of detent, and a minimum of 0.44 additional to a maximum of six pounds total for detent, with the load applied at the edge of a 4.5" torque arm. Spring steel heat treated to RC 38–42 is preferred material.

The blank shown in FIG. 5 may be employed for both right hand and left hand visors wrapped as shown in FIGS. 6, 7 and 8 for right hand and oppositely for left hand visors accommodating use of the rod arm shown in FIG. 3 for right and opposite for left hand visors. A typical cycle test over 5,000 cycles checked at 1,000 intervals indicated no significant variation in torque retention either at the detent position or out of detent in either clockwise or counterclockwise direction.

I claim:

1. Automotive vehicle sun visor comprising sun screening visor body with internal flat reinforcement core means, cylindrical mounting rod arm means, pivotal visor edge, mounting rod connecting means for accommodating raised storage and lowered adjustable angle use positions, said connecting means including resilient detent means for retaining said stored position with predetermined torque resistance against displacement and friction means of relatively lower torque resistance for retaining said visor in any lowered adjusted angle use position, said connecting means beinfg characterized by wrap around sheet metal spring means formed to extend around said cylindrical rod arm means with ends secured to both sides of said visor body reinforcement core means, and inter-engaging flat means in both said spring and rod means providing said detent means.

2. Sun visor of claim 1 wherein wrap around engagement of said spring and rod means with said respective flat means disengaged provides said relatively lower torque resistance.

3. Sun visor of claim 1 wherein said sheet metal spring means is initially formed as a flat blank.

4. Sun visor of claim 3 wherein said flat blank includes rivet holes in alignable position for securing the ends to said visor body reinforcement core means with rivets when formed to extend around said cylindrical rod arm means.

5. Sun visor of claim 3 wherein said blank in a secondary operation is provided with a free form in which the ends are angularly separated to require compressive closing and securing to said visor body reinforcement core means.

6. Sun visor of claim 1 wherein said rod arm means projects through said metal spring means, and a "U" cross section metal stiffener is provided to engage the end extension of said mounting rod arm means, said visor body reinforcement core means including a core edge engaging said stiffener within its spaced leg opening.

7. Sun visor of claim 6 wherein an end fitting is connected to said core means having a projection engaging said stiffener means.

* * * * *